United States Patent [19]

Parker et al.

[11] 4,284,516

[45] Aug. 18, 1981

[54] PROCESS FOR THE REMOVAL OF LOW LEVEL (PPM) HALOGENATED CONTAMINANTS

[75] Inventors: Dane K. Parker, Massillon; Richard J. Steichen, Fairlawn, both of Ohio

[73] Assignee: The Goodyear Tire & Rubber Company, Akron, Ohio

[21] Appl. No.: 118,294

[22] Filed: Feb. 4, 1980

[51] Int. Cl.$^3$ ............................................... C02F 1/70
[52] U.S. Cl. ................................... 210/757; 210/909; 252/181; 570/204; 585/469
[58] Field of Search .................. 210/59, 63 R, 61, 47; 252/180, 181

[56] References Cited

PUBLICATIONS

Oku, A. et al., "A Complete Dechlorination of Polychlorinated Biphenyl by Sodium Naphtalene", Chemistry & Industry, vol. 21, pp. 841–842 (1978).

Oku, A. et al., "Reduction of 6,6-Disubstituted Fulvenes and 1,2-Benzoheptafulvene by Naphtalene Radical Anion", Bull. of the Chem. Soc. of Japan, vol. 52 (2), 524–528 (1979).

Primary Examiner—Benoît Castel
Attorney, Agent, or Firm—D. O. Nickey

[57] ABSTRACT

There is disclosed a process for the removal of low level halogenated organic compounds forming a fluid through treatment with an alkali metal aromatic radical anion reagent.

5 Claims, No Drawings

PROCESS FOR THE REMOVAL OF LOW LEVEL (PPM) HALOGENATED CONTAMINANTS

TECHNICAL FIELD

Process for the removal of low level (ppm) halogenated organic compounds from a fluid through treatment with an alkali metal aromatic radical anion reagent. In particular, this invention is concerned with the effective removal of low level concentrations (ppm) of halogenated aromatics from heat transfer fluids.

BACKGROUND ART

Many halogenated compounds are employed for a variety of practical uses. For example, as pesticides, soil fumigants, solvents, etc., however, many escape into the environment during manufacturing or application and in spills. Some, such as pesticides, are applied in such a manner as to become part of the environment. It has been found that a number of such compounds, particularly polyhalogenated compounds are toxic to plant and animal life. Although some of the compounds are bio- and/or photo-degradable so that they soon disappear from the environment, a substantial number are resistant to environmental degradation and remain in poisonous form for periods as long as many months or years. As a result, a good deal of research has been done to find reliable and economical treatment methods to degrade such compounds into environmentally safe products.

Various methods are known in the literature pertaining to the dehalogenation of organic halides, especially aromatic halides. Baltzly and Phillips, *Journal of American Chemical Society*, 68, 261 (1964) described catalytic dehalogenation with palladium and hydrogen. Dehalogenation is also possible on relatively stable aromatic chlorine by using sodium borohydride in the presence of metal catalysts such as palladium, cobalt, nickel and copper as described by R. Egli, *Helvetica Chem. Acta*, 51, 2090 (1968). British Pat. Nos. 1,457,608 and 1,458,633 describe a dehalogenation process of aromatic halides using aqueous $HCO_2Na$, a hydrogenation catalyst and a surfactant. Ashby and Lynn describe the use of lithium aluminum hydride ($LiAlH_4$) in combination with first row transition metal halides for dehalogenation, *Journal of Organic Chemistry*, 43, 1263 (1978).

Photochemical methods for aromatic dehalogenation can be found in a paper by N. Bunce et al., *Journal of Chemical Society*, Perkin II, p. 880 (1978) and also in U.S. Pat. Nos. 3,977,952 and 4,144,152 and references therein. Still another method, involving the use of highly reactive organo sodium compounds, was originally developed as an analytical technique for the decomposition of organic halides. See Benton and Hammel, *Analytical Chemistry*, 20, 269 (1948), Pecherer et al., *Analytical Chemistry*, 22, 311 (1950) and Liggett, *Analytical Chemistry*, 26, 748 (1954). More recently Oku et al., *Chemistry and Industry*, p. 841, (1978) adapted this analytical technique to the gross dechlorination of polychlorinated biphenyl materials in tetrahydrofuran solvent with sodium naphthalide reagent at 0° C. Oku et al., also state that normal or inverse addition of the naphthalide reagent is effective. Under these conditions they claim 1.1 to 1.3 moles of sodium naphthalide reagent per mole of chlorine is sufficient to remove all the chlorine.

Recent articles describing other processes for the destruction of polychlorinated biphenyls are found in *Science News*, Vol. 116, Nos. 25 and 26, Page 422 (December 1979) and *Electronic and Engineering Times*, Oct. 29, 1979, pages 1 and 4.

To applicants' knowledge there have been no prior teachings on the use of a chemical treatment for the effective removal of low concentrations (parts per million, hereafter known as ppm) or halogenated contaminants with alkali metal aromatic anion reagents from an inert liquid substrate.

DISCLOSURE OF INVENTION

A process for the effective dehalogenated of low level concentrations (ppm) of halogenated organic compounds through treatment with an alkali metal aromatic radical anion reagent, wherein the reagent is prepared by dispersing molten alkali metal in an inert fluid that has a boiling point above the melting of the alkali metal, the improvement comprising the rapid cooling of the dispersed molten alkali metal/inert fluid mixture to ambient temperature with vigorous agitation under an inert atmosphere followed by addition of an appropriate amount of an aromatic radical anion forming substrate dissolved in a nonhydroxylic ether containing solvent.

Also disclosed is a process for the effective dehalogenation of low level concentrations (ppm) of halogenated organic compounds through treatment with an alkali metal aromatic radical anion reagent solution, wherein the reagent is contacted with the liquid substrate, inert towards the reagent, contaminated by low level concentrations (ppm) of halogenated organic compounds by agitation in a molar ratio of 25 to 500 alkali metal aromatic radical anion reagent solution to halide at a temperature from 0° to 100° C.

Representative of the halogenated organic compounds that can be dehalogenated through utilization of the process of the present invention are kepone (and its gemdiol) decachloropentacyclo(5.3.0.0$^{2,6}$.0$^{3,9}$.0$^{4,8}$.)decan-5-one; halogenated biphenyls;halogenated cyclodienes, such as aldrin, dieldrin, and hexachlorocyclopentadienes; dibromochloropropane; tetrachlorodibenzodioxin and halogenated organic phosphates, such as 2,2-dichlorovinyldimethyl phosphate.

Representative of the alkali metal aromatic radical anion reagents that can be employed in the process of this invention are: lithium naphthalide, potassium naphthalide, sodium naphthalide, lithium anthracide, potassium anthracide and sodium anthracide. A more complete listing can be found in *Radical Anions* by E. T. Kaisen and L. Kevan, eds., Interscience Publishers, (1968). See also N. D. Scott, J. F. Walker and V. L. Hansley, *J. American Chemical Society*, 58, 2442 (1936), which are incorporated herein.

A listing of the fluids which can be used in the preparation of the reagent can be found in Kaisen and Kevan, supra and Scott et al., supra. Preferred solvents for the reagent preparation are dimethyl ether, ethylene glycol, dimethyl ether and tetrahydrofuran being the most preferred.

A listing of the aromatic radical anion forming substrate and suitable nonhydroxylic ether containing solvents can be found in N. D. Scott et al., supra.

MORE DETAILED DESCRIPTION

The preparation of an alkali metal aromatic radical anion reagent is known in the art, however, scale-up of known laboratory preparations results in greatly varying reaction times for the formation of the reagent depending upon the surface area of the alkali metal pieces and the amount of oxide coating. To overcome this problem and obtain reproducible results, a new procedure was devised, wherein 150–400 milliliters of an inert organic liquid having a boiling point above the melting of the alkali metal is used per mole of alkali metal to form the dispersion. By heating any size piece(s) of alkali metal in the inert organic fluid under an inert atmosphere above its melting point with vigorous agitation produces a finely dispersed (highly reactive) alkali metal sand. Upon rapidly cooling to ambient temperature with vigorous agitation, the alkali metal solidifies into fine, bright spheres with high surface area and minimum oxide coating.

To the alkali metal dispersion just prepared is added at least a molar excess of the aromatic radical anion forming substrate, for example, naphthalene dissolved in a solvent such as tetrahydrofuran (hereinafter known as THF). Addition of naphthalene dissolved in THF to the dispersed alkali metal results in a deeply colored green-black reagent.

To minimize the cost of the reagent solution and to maximize its effectiveness, a ratio of one mole alkali metal to 250 milliliters of inert dispersing fluid to 1.3 moles of the aromatic anion forming substrate to 500 milliliters of nonhydroxylic ether containing solvent was found to be highly effective, however, one skilled in the art will realize that other ratios can be utilized if cost is not a factor.

The process of the present invention is specifically concerned with the removal of low level concentrations (ppm) of aromatic type halides (for example, polychlorinated biphenyl, hereinafter known as PCB's) from fluids. It has been discovered that mole ratios of sodium naphthalide to chlorine in the 1 to 1.1 to 1 to 1.3 range as taught by Oku et al., supra, are ineffective in obtaining any significant reduction of PCB concentrations at 60° C. after a two hour reaction period. It has been determined that the reagent to halide molar ratio must be from 25 to 500 to obtain significant reduction of the PCB concentration.

To determine the effectiveness of the process of the present invention, analytical procedures are critical due to the very small concentrations of the halogenated contaminants. Quantitative analysis for the halogenated contaminants (specifically PCB's) were performed on a Hewlett-Packard 5840A gas chromatograph with an electron capture, $Ni^{63}$ detector. Gas chromatograph conditions for all analyses in the following examples were as follows:

| | |
|---|---|
| Injection port temperature | 225° C. |
| Detector temperature | 250° C. |
| Oven temperature | 180° C. |
| Gas flow rate, 95% Ar/5% $CH_4$ | 20 ml/minute |
| 3% OV-1 on supelcoport | 100/120 mesh |

The following examples are supplied to illustrate and not to limit the scope of the present invention.

EXAMPLE 1

Preparation of Sodium Naphthalide Reagent—Laboratory Scale

A 500 ml. three neck flask was charged with 50 ml. of Therminol-66 ® (Trademark for partially hydrogenated terphenyl, hereinafter known as Therminol-66 ® oil) and 5.0 grams (0.217 mole) sodium metal. The system was purged with nitrogen and heated to 170° C. Five minutes after reaching 170° C. vigorous agitation was begun and then the mixture was rapidly cooled to ambient temperature resulting in fine, bright sodium particles.

To these sodium particles suspended in oil, a solution of 32.0 grams (0.25 moles) of naphthalene dissolved in 200 ml. of THF was added with gentle stirring. The formation of green radical anion reagent began immediately. Formation of reagent was complete in less than one hour. The sodium naphthalide concentration was 0.73 to 0.75 molar.

The preparation of the reagent can be conducted by adding the alkali metal to a dispersing agent which may or may not be contaminated with halogenated organic compounds. It is evident that industrial use of the process of the present invention would use contaminated oil in the preparation of the reagent, thus, minimizing the cost of the preparation of the reagent.

The reagent just prepared in Example 1 was used as a stock solution for the following examples:

EXAMPLE 2

Lab Scale Treatment of Therminol-66 ® Contaminated With 83 ppm PCB's 250 ml. of Therminol-66 ® contaminated by 83 ppm PCB's was charged into a 500 ml. flask fitted with thermometer, nitrogen purge, mechanical stirrer and condenser. To this was added 2 ml. of the reagent prepared in Example 1 and agitated for 2 hours at 60° C., then quenched with 5 ml. of $H_2O$ and cooled to ambient temperature. Removal of excess water and solvent was accomplished by rotary evaporation under vacuum. The residue was then analyzed by gas chromatograph to determine that only 51 ppm PCB's by weight remained.

EXAMPLE 3

The procedure of Example 2 was followed except that 5 ml. of reagent was used instead of 2 ml. to obtain 37 ppm PCB's by weight.

EXAMPLE 4

The procedure of Example 2 was followed except that 10 ml. of reagent was used instead of 2 ml. to obtain a PCB concentration of 8 ppm by weight.

EXAMPLE 5

The procedure of Example 2 was followed except that 20 ml of reagent was used instead of 2 ml. to obtain 1.0 ppm PCB's by weight.

EXAMPLE 6

The procedure of Example 2 was followed except that 30 ml. of reagent was used instead of 2 ml. to obtain less than 1.0 ppm PCB's by weight.

The data obtained from Examples 2 through 6 indicates that a minimum ratio of reagent to chlorine content of approximately 100 is necessary to effectively remove greater than 90% of the PCB's from the contaminated oil.

EXAMPLE 7

Preparation of Reagent for Bench Scale Application

To a three neck five liter vessel fitted with a thermometer, nitrogen gas inlet, mechanical stirrer and condenser was charged with 787 ml. of Therminol- 66® oil contaminated with 83 ppm PCB's by weight and 78.7 grams (3.28 moles) of sodium metal. The system was purged with nitrogen and heated to 150° to 170° C. with slow agitation. After 5 minutes at 170° C. the mixture was vigorously stirred as the mixture was rapidly cooled to ambient temperature resulting in a fine, bright sodium sand.

To the sodium metal dispersed in the oil was added 503.3. grams (3.9 moles) naphthalene dissolved in 1575 ml. of THF with gentle stirring. The formation of the green radical anion reagent began immediately. Formation of the reagent was complete after 1 hour resulting in a sodium naphthalide concentration of 1.5 molar.

EXAMPLE 8

Treatment of PCB Contaminated Oil With Sodium Naphthalide Reagent

A 45.5 liter reaction vessel was used in a number of runs treating Therminol-66® contaminated with 82 ppm PCB's by weight with reagent prepared from Example 7. In each run 31 kg of contaminated Therminol-66® oil was treated with varying amounts of sodium naphthalide reagent. In all cases the contaminated oil was contacted with reagent at ambient temperatures, under nitrogen blanket with mild agitation for one hour and then quenched with a stoichiometric amount of water to the reagent charged to destroy excess reagent. The results from runs 1 through 4 are found in Table I.

TABLE I

| Run | Kg. of Reagent [1.5 molar] | Ratio Reagent/ [PCB] Amt. | Start [PCB] ppm | Final [PCB] ppm |
|---|---|---|---|---|
| 1 | 0.69 | 297 | 82 | 3.0 |
| 2 | 0.57 | 244 | " | 2.8 |
| 3 | 0.62 | 268 | " | 3.0 |
| 4 | 0.79 | 337 | " | 2.0 |

Table I demonstrates that the reaction may easily be scaled up and run at ambient temperatures in nonspecialized equipment to effectively remove low concentrations of PCB contaminants from a fluid that is inert toward the reagent.

To one skilled in this art it would be obvious that halogenated organic compounds other than PCB may be effectively removed by a similar procedure.

Although this invention has been described with reference to illustrative embodiments thereof, it will be apparent to those skilled in the art that the principles of this invention can be embodied in other forms but within the scope of the claims.

What is claimed is:

1. A process for the dehalogenation of low level concentrations (PPM) of polychlorinated biphenyls (PCB's) dispersed within a contaminated substrate wherein said contaminated substrate is contacted with a reagent in the molar ratio of 25 to 500 moles of reagent per mole of halide contaminant contained within the fluid substrate; said reagent being prepared by:

(1) dispersing molten alkali metal selected from the group consisting of lithium, sodium and potassium at a temperature of at least 150° C. in the contaminated substrate that is inert toward the alkali metal and has a boiling point above the melting point of the alkali metal in the ratio of 250 milliliters of contaminated substrate per mole of alkali metal;
    (2) cooling the dispersed molten alkali metal/contaminated inert fluid mixture to ambient temperature with vigorous agitation under an inert atmosphere then adding;
    (3) 1.3 moles of an aromatic radical anion forming compound selected from the group consisting of biphenyls, alkyl substituted biphenyls, naphthalene, alkyl substituted naphthalene, anthracene, alkyl substituted anthracenes, naphtacene, alkyl substituted naphtacene, ortho, meta and para terphenyl, and alkyl substituted terphenyls dissolved in 500 milliliters of a nonhydroxylic ether containing solvent selected from the group consisting of dimethyl ether, ethylene glycol dimethyl ether and tetrahydrofuran, with stirring.

2. A process for the dehalogenation of low level concentrations (PPM) of polychlorinated biphenyls (PCB's) dispersed within a contaminated substrate wherein said contaminated substrate is contacted with a reagent in the molar ratio of 25 to 500 moles of reagent per mole of halide contaminant contained within the fluid substrate; said reagent being prepared by:

(1) dispersing molten alkali metal selected from the group consisting of lithium, sodium and potassium at a temperature of at least 150° C. in a fluid that is inert toward the alkali metal and has a boiling point above the melting point of the alkali metal in the ratio of 250 milliliters of contaminated substrate per mole of alkali metal;
    (2) cooling the dispersed molten alkali metal inert fluid mixture to ambient temperature with vigorous agitation under an inert atmosphere then adding;
    (3) 1.3 moles of an aromatic radical anion forming compound selected from the group consisting of biphenyls, alkyl substituted biphenyls, naphthalene, alkyl substituted naphthalene, anthracene, alkyl substituted anthracenes, naphtacene, alkyl substituted naphtacene, ortho, meta and para terphenyl, and alkyl substituted terphenyls dissolved in 500 milliliters of a nonhydroxylic ether containing solvent selected from the group consisting of dimethyl ether, ethylene glycol dimethyl ether and tetrahydrofuran, with stirring.

3. A process according to anyone of claims 1 or 2 wherein the preferred alkali metal is sodium.

4. A process according to anyone of claims 1 or 2 wherein the preferred aromatic radical anion forming substrate is naphthalene.

5. A process according to anyone of claims 1 or 2 wherein the preferred nonhydroxylic ether containing solvent is tetrahydrofuran.

* * * * *

Dedication 4,284,516.—*Dane K. Parker* Massillon, and *Richard J. Steichen,* Fairlawn, Ohio. PROCESS FOR THE REMOVAL OF LOW LEVEL (PPM) HALOGENATED CONTAMINANTS. Patent dated Aug. 18, 1981. Dedication filed Oct. 8, 1981, by the assignee, *The Goodyear Tire & Rubber Co.*

Hereby dedicates to the Public claims 1 through 5 of said patent.
[*Official Gazette December 22, 1981.*]